US006531430B1

(12) United States Patent
Lambert et al.

(10) Patent No.: US 6,531,430 B1
(45) Date of Patent: *Mar. 11, 2003

(54) ENGINES LUBRICATED WITH VEGETABLE OIL LUBRICANTS

(76) Inventors: James W. Lambert, 1127 W. Colorado Ave., Colorado Springs, CO (US) 80904; Duane L. Johnson, 113 OBrien Ter., Big Fork, MT (US) 59911

( * ) Notice: Subject to any disclaimer, the term of this patent is extended or adjusted under 35 U.S.C. 154(b) by 0 days.

This patent is subject to a terminal disclaimer.

(21) Appl. No.: 09/935,969

(22) Filed: Aug. 23, 2001

Related U.S. Application Data

(63) Continuation-in-part of application No. 09/467,351, filed on Dec. 20, 1999, now abandoned, and a continuation-in-part of application No. 09/281,416, filed on Mar. 30, 1999, now abandoned, which is a continuation-in-part of application No. 08/912,130, filed on Aug. 15, 1997, now Pat. No. 5,888,947, which is a continuation of application No. 08/468,417, filed on Jun. 6, 1995, now abandoned.

(51) Int. Cl.[7] .................... C01M 105/38; C01M 129/76
(52) U.S. Cl. ....................... 508/491; 508/451; 508/501; 123/1 A
(58) Field of Search .......................................... 508/491

(56) References Cited

U.S. PATENT DOCUMENTS

| | | | | | |
|---|---|---|---|---|---|
| 4,557,841 A | * | 12/1985 | Arndt | .................... | 252/32.7 E |
| 4,740,324 A | * | 4/1988 | Schur | ........................ | 252/56 R |
| 4,925,581 A | * | 5/1990 | Erickson et al. | ........... | 252/48.2 |
| 5,282,989 A | | 2/1994 | Erickson et al. | | |
| 5,427,704 A | | 6/1995 | Lawate | | |
| 5,468,405 A | | 11/1995 | Klein et al. | | |
| 5,580,482 A | * | 12/1996 | Chasan et al. | .............. | 508/243 |
| 5,888,947 A | | 3/1999 | Lambert et al. | | |
| 6,382,170 B1 | * | 5/2002 | Mang et al. | ............ | 123/196 A |
| 6,383,992 B1 | * | 5/2002 | Garmier et al. | ............. | 508/491 |

* cited by examiner

*Primary Examiner*—Ellen M. McAvoy
(74) *Attorney, Agent, or Firm*—Rick Martin; Patent Law Offices of Rick Martin, PC

(57) ABSTRACT

An internal or an external combustion engine which has at least one surface coated with a lubricant made up of vegetable-based products. The products preferably include a base oil containing primarily mono, di and triglycerides and free fatty acids, 5–30% by volume hydroxy fatty acids and 5–10% of the oil additives by volume of animal or vegetable waxes.

14 Claims, 2 Drawing Sheets

ENGINES LUBRICATED WITH VEGETABLE OIL LUBRICANTS

This application is a continuation-in-part of application Ser. No. 09/467,351, filed on Dec. 20, 1999 now abandoned, application Ser. No. 09/281,416 filed on Mar. 30, 1999, now abandoned which was a continuation-in-part of application Ser. No. 08/912,130, filed Aug. 15, 1997 which issued as U.S. Pat. No. 5,888,947, which was a continuation of Ser. No. 08/468,417, filed Jun. 6, 1995, now abandoned.

BACKGROUND OF THE INVENTION

This invention relates to internal and external combustion engines of all types lubricated with vegetable-based lubricants. The engines utilize the lubricants to prevent metal-to-metal contact between multiple moving parts and/or moving and non-moving parts.

Traditionally, internal combustion engines have utilized petroleum-based lubricants. These lubricants are increasingly becoming an environmental problem because bacteria which metabolize these materials are not widely distributed in the environment.

Previously, animal and/or vegetable oils and waxes have been added to petroleum-based lubricants to enhance one or more properties of the lubricant. The lubricants of this invention, however, utilize vegetable-based oils and waxes as the primary lubricant with any coal or petroleum-based materials being present in small amounts as an additive(s). The new lubricants can also include commonly used, non-hydrocarbon additives, e.g., alkaline earth phenates, micronized nylon and silicones.

SUMMARY OF THE INVENTION

The engines of this invention are lubricated by vegetable-based lubricants including as primary components, a base oil, hydroxy fatty acids and vegetable and/or animal waxes.

DETAILED DESCRIPTION OF THE FIGURES

Figure 1:
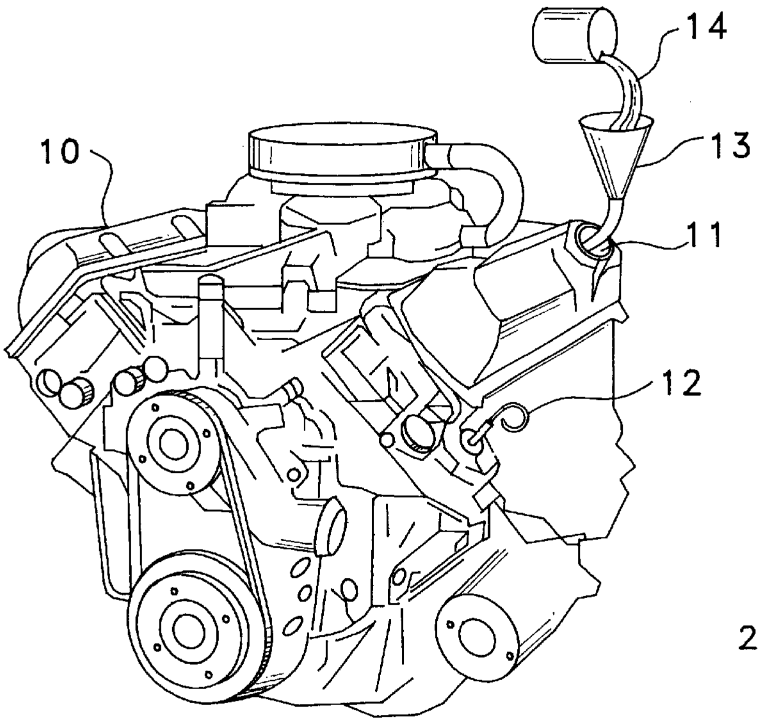
FIG. 1 shows an uncoupled reciprocating internal combustion engine during the initial lubrication process.

FIG. 1 depicts an uncoupled automotive engine 10 having an oil filler hole 11 and an oil level measuring stick 12. A funnel 13 is resting in hole 11 and is being filled by a stream 14 of the vegetable-based oil of this invention to provide an initial lubricant film for anti-corrosion and lubrication purposes until and during the initial start-up of the engine once the engine is coupled to its required hoses, electronic harnesses, etc.

Figure 2:
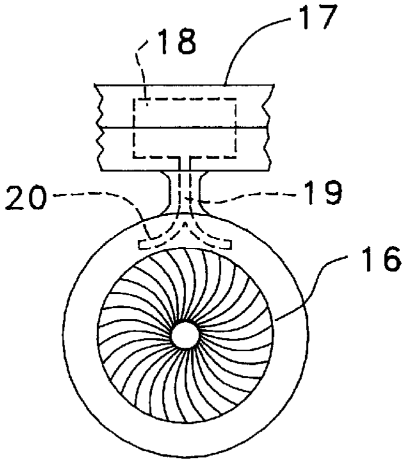
FIG. 2 shows a jet engine suspended from a portion of an aircraft wing containing a lubricant reservoir.

FIG. 2 depicts a jet engine 16 suspended from a portion of the wing 17 of a jetliner (not shown). A filled container 18 of a lubricant of this invention has the formula 85% base oil, 7% hydroxy triglycerides, 5% ester by weight, and additives such as pour point depressants and anti-oxidants. The lubricant flows downwardly through a tubing 19 allowing the lubricant to flow through the manifold tubing system 20 (partially shown) providing an appropriate coating of predetermined portions of moving parts within the engine 16.

Figure 3:
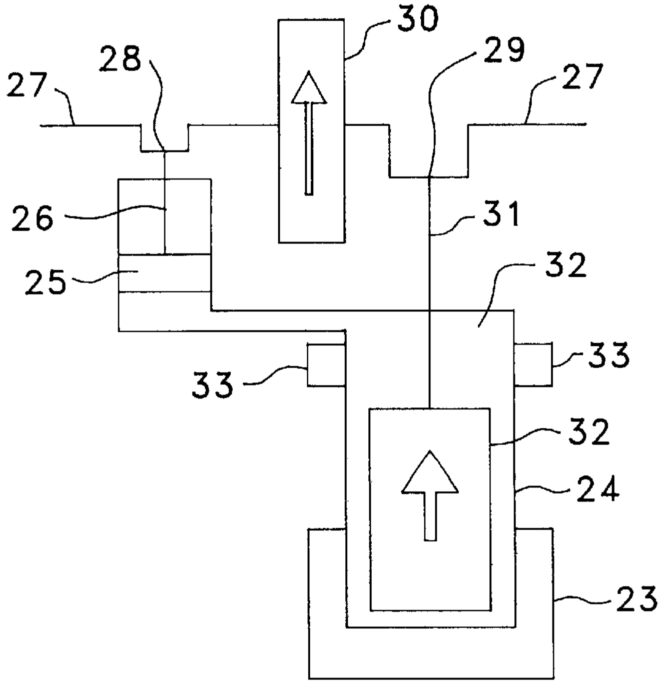
FIG. 3 is a diagrammatic representation of an external combustion engine.

FIG. 3 is a diagrammatic view of a Stirling external combustion engine. Such engines are, inter alia, useful in outer space where the extreme temperatures of space can be used beneficially. These engines also are very desirable where fuel and exhaust pollution are of great concern.

In operation, heater 23 heats cylinder 24 displacing power piston 25 upwardly. The movement causes connecting rod 26 to rotate drive shaft 27. Drive shaft connection 28 is preferably at 90° to drive shaft connection 29. Rotation of drive shaft 27 drives fly wheel 30 to rotate clockwise and, via connecting rod 31, lifts fluid displacer 32 upwardly toward fluid 33. Heater 23 is then turned off and cooler 34 cools the internal fluid 32 while the rotating flywheel 30 drives the power piston 25 downwardly. As the pistons 25 and displacer 32 return to the lower positions. The cooler 33 is turned off and heater 23 activate to begin a new cycle.

Figure 4:
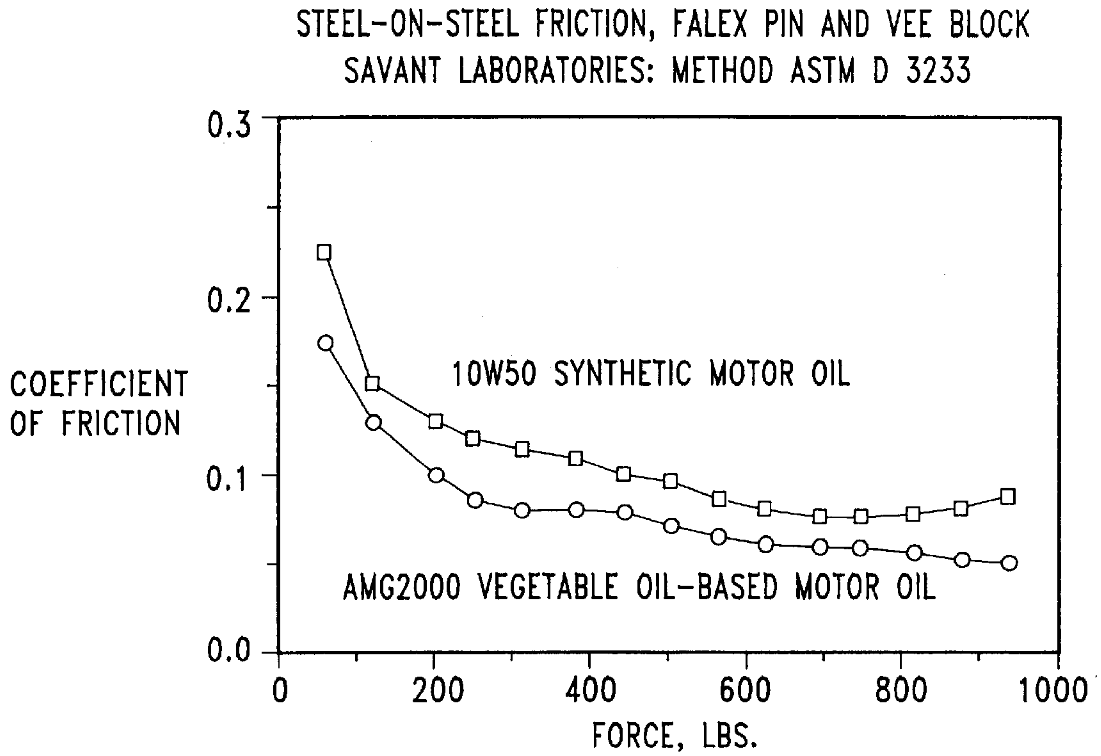
FIGS. 4 and 5 are graphs showing the unexpectedly good results from lubricity tests comparing a commercial oil of this invention and a turbine oil.

FIG. 4 is a graph of a comparison of AGRO Management Group's AMG2000 commercial vegetable-based oil and a Mobil Oil premium commercial petroleum 10W50 motor oil. The lubricity test utilized ASTM protocol D 3233 to determine the coefficient of friction. The preferred AMG 2000 lubricant generally has a composition of 79 wt % of canola oil. It can be sunflower oil or a mixture of the two; 10% neutral oil; 4% castor oil; 4% anti-oxidant package, Lubrizol 7652; and 3% of an anti-wear additive, Elco 234. Savant, Inc. is a laboratory and consulting firm located in Midland, Mich., USA.

The graph shows the coefficients of friction of a lubricated steel pin being spun between two steel blocks under increasing clamping force squeezing the blocks onto the pin. The coefficient of friction should be constant, regardless of load, indicating an operating lubricant film. A rapid increase in the coefficient indicates a breakdown of the lubricant and the rapid increase in friction, heat, and contact stresses that lead to catastrophic welding of the pin to the blocks.

The AMG2000 maintains an approximate 25% reduction in friction over a synthetic based motor oil over the 0 to 1000 lb force range.

Figure 5:
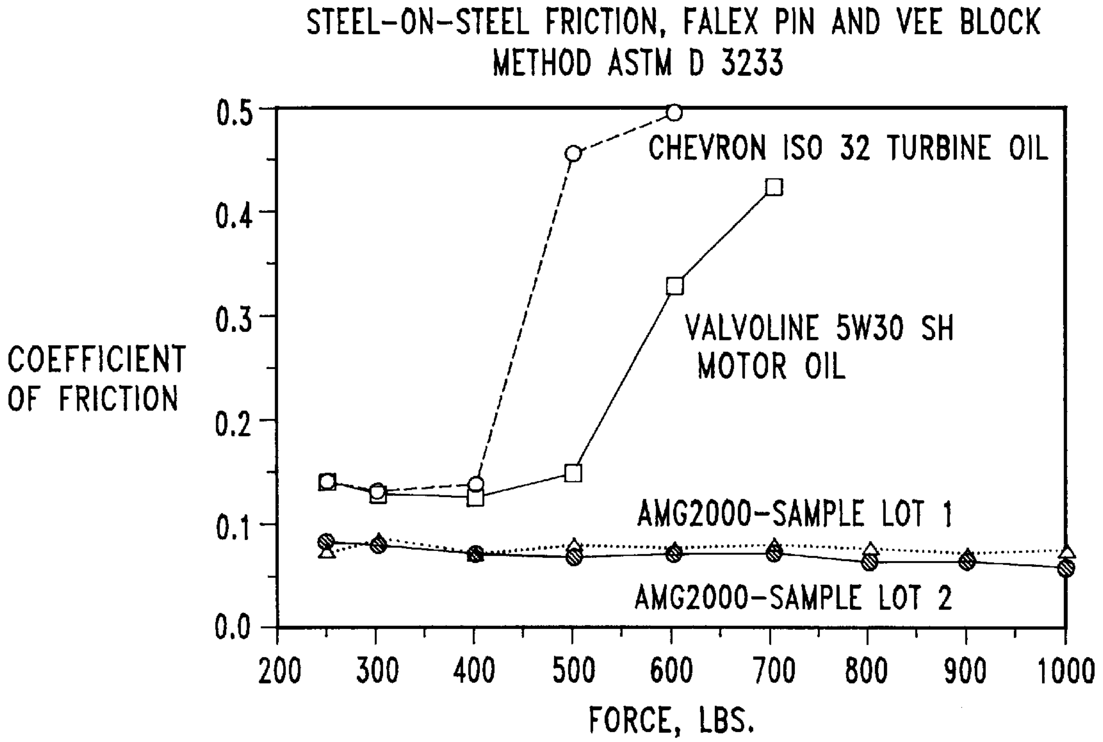

FIG. 5 utilizes an identified commercial petroleum lubricant. The research was done by Blaine N. Rhodes, Consulting, of 15908 S. E. Newport Way, Bellevue, Wash., U.S.A.

Both petroleum-based oils started the test at a coefficient close to 0.15. The light turbine oil failed at just over 400 lbs. The heavier motor oil lasted just over to just over 500 lbs force. Both of these values are in the "wear" regime of contact. The "extreme pressure" regime starts at 800 lbs of contact force.

The two AMG2000 samples, taken from two separate production lots at two different times, started, lasted and ended the 1000lb force test at 0.075 coefficient of friction, or about 50% of the friction level of the petroleum oils. This work was performed by Blaine N. Rhodes, Consulting. Bellevue, Wash., USA.

Environmental Data

The lubricant of this invention containing environmentally friendly additive packages have provided unexpectedly good vehicle pollutant reductions as shown by the following:

| Exhaust gas (tailpipe emissions- EPA authorized test) | Petroleum (10w30) | AMG2000 |
|---|---|---|
| Hydrocarbons (HC) | 0.0710 | 0.0480**** |
| Carbon Monoxide (CO) | 1.7640 | 0.9260*** |
| Carbon Dioxide (CO2) | 512.08 | 505.74* |
| Nitrous Oxides (NOx) | 0.2590 | 0.0520**** |

****probability of error less than 0.00001
***probability of error less than 0.0001
*probability of error less than 0.05

Data above was derived from replicated trials of a 6 cylinder, 2001Ford Explorer. Tests were conducted by Automotive Testing Laboratories (ATL), an authorized EPA emissions testing facility, in East Liberty, Ohio in July, 2001. The test used was a standard FTP75 protocol used to determine emissions for the U.S. government.

| Data from a 2000 Ford Ranger (3300 miles per oil drain) | | |
|---|---|---|
| Variable measured | Petroleum (5w30) | AMG2000 |
| Acid Number (mg KOH/oil g) | 9.5 | 5 |

GENERAL DESCRIPTION OF THE INVENTION

The vegetable-based lubricants were developed for use in internal combustion engines, particularly for use in small engine applications, e.g., four-cycle engines for lawnmowers. The invention, however, has a much broader application range in all forms of internal and external combustion engines.

The lubricants have three main components: a) a base oil, an oil containing hydroxy fatty acids and vegetable or animal waxes. The base oil consists of primarily mono, di, and triglycerides and free fatty acids; b) vegetable oils containing hydroxy fatty acids, preferably making up 5% to 20% of the oil; and c) waxes or esters comprising 5% to 10% of the oil additives by volume. Additional synthetic mimics of natural products derived from animal or vegetable compounds may be added up to 5% of the compositional volume.

The base oil is derived from a variety of unrefined vegetable oil sources. The following are examples: soybean, high oleic soybean (>72% oleic acid) rapeseed, high oleic safflower (<75% oleic acid), sunflower, high oleic sunflower (<80% oleic acid) and, in fact, any vegetable oil where the primary fatty acid composition of the triglyceride is at least 16 carbon atoms and preferably 16 to 24 carbons in length. Currently, the preferred base oil is from canola, also known as low erucic rapeseed from sunflower seed and mixtures thereof.

The hydroxy fatty acids can be derived from castor, lesquerella or other hydroxy fatty acid sources. Hydroxy fatty acids can also be derived by treating any of the above vegetable oils with lipoxigenase enzymes. The preferred source of hydroxy fatty acids is castor beans.

The most common sources of the waxes are jojoba, meadowfoam or lanolin. The preferred sources of these waxes are jojoba or synthetic dimers derives from free fatty acids and fatty alcohols. The crude vegetable oils used contain certain various natural antioxidants. Natural antioxidants include pyridines and lectins. Synthetic antioxidants are also acceptable. Preferred synthetic mimics include pyrazines and other cyclic antioxidants.

The preferred applied lubricant formulation to date for an internal combustion engine oil consists of 85% by volume of base oil, 10% by volume oil sources containing hydroxy fatty acids and 5% by volume liquid wax sources. Specific lubricant applications, e.g., two cycle and racing car engines, may require modification of the base lubricant formulation as well as the addition of antioxidants.

The base oil is the largest component of the lubricant composition. The preferable percentage of the base oil will vary with its fatty acid composition and its intended use. With small, air-cooled engines ranging from 3.5 to 20 hp, the percentage of the base oil will vary between 75% and 85% of the composition by volume.

A high percentage of at least 65% of 16 to 22 carbon fatty acids is required in order for the base oil to provide adequate lubrication. The longer chain fatty acids are preferred for providing longevity to the lubricant. Preferred sources of long chain fatty acids are derived from members of the family Cruciferae, the family Compositae and the family Leguminosae. Common oilseeds in these families are [Cruciferae] canola, rapeseed, crambe, lesquerella; [Compositeae] sunflower, safflower, flax, meadowfoam; and [Leguminoseae] soybean. Other sources of the base oil include cotton, corn, olive, peanut and other common oils. Each base oil has unique functionality and lubricant formulations will vary depending upon base oil used. An oleic fatty acid content of 72–90 percent is preferred as increasing amounts of this acid proportionately enhance the performance quality of the resulting lubricant.

This allows additional fine-tuning of the qualities of the base oil. A number of blends have been tested. The following blend, e.g., a blend of 80% canola and 20% rapeseed have been tested and worked well. The ratio of rapeseed to canola can be varied greatly.

Other lubricant blends include crambe oil and canola. The conventional and high oleic types safflower or sunflower oils all worked well as a base oil when blended with canola oil. As with rapeseed, the ratio of the blends does not appear in be particularly important with crambe, safflower or sunflower oils. Blends of canola oil and soybean oil have also been tested. A blend of 7% soybean and 93% canola is currently preferred. If the amount of soybean oil is more than 20%, decreases in oxidative stability have been noted. Soybean oil is particularly convenient as a component of the invention due to the large amount of soybeans grown worldwide and contains a large percentage of natural antioxidants. It is a very common crop all over the world, so the oil is generally easily available at low cost.

The components of the base oil, other than the mono-, di- and triglycerides also play an important role in the functionality of the lubricants. Thus, the phosphotidyl cholines (i.e., lethicin and lectins) function in tying up metal contaminants, acting as an antioxidant as well as an emulsifier of any water in the oil. Aliphatic alcohols, terpenoids and saponins also appear to function as detergents. Waxes and hydroxy fatty acids are particularly well suited for bonding to metals, assuring the user of reduced metal-to-metal contact. Naturally occurring pyrazines, vitamins (tocopherols) and some organic "pigments" also function as antioxidants. Hydroxy fatty acids can be used in the dimerization process, creating additional wax esters and branched fatty acids. Ongoing tests of the vegetable-based oil composition in small four-cycle engines (3.5 to 5 hp) indicate the oil allows the lubricated engine to run up to 30% cooler than engines run on conventional petroleum-based oils. Moreover, tests indicate that the vegetable-based lubricant reduces engine wear by an estimated 10% to 20% over conventionally lubricated engines. This appears to be due to a reduction in friction within the engine. The oil composition, measured by gas chromatographic analysis, without added antioxidants remains relatively constant for up to 25 hours. Carbon chains of free fatty acids having +/−20% carbon atoms are unaffected. Monounsaturated 18 carbon chains are unaffected. At 40 hours, the oils show a dramatic increase in saturated 16:0, 18:0 and 20:0 methylated free fatty acids as engine friction macerates the triglycerides.

The percentage of long chain fatty acids also responds to the function of time. After 25 hours, the percentage of long chain fatty acids changes from an estimated 95% of the oil composition to 90%. At 40 hours, the long chain component measures 80 to 85% of the oil composition. However, all degrade eventually. What is suspected to be occurring is a mechanical fracturing or dimerization of the polyunsaturated fatty acid components of the invention. This fracturing may be due to a loss of antioxidants or a loss of antioxidant function at the unsaturated sites.

Some types of base oil may require additional processing to bring the composition of the base oil into the optimal range for glyceride composition. Soybean oil is one base oil that is known to need additional processing to be suitable.

Interesterification and/or transesterification may be used to stabilize the base oil. One method of processing is to use alkali isomerization or clay catalyzation to form monocyclic and bicyclic fatty acids, which are hydrogenated to form alicyclic and aromatic rings (the Diers-Alder Reaction). Alternatively, a Simmons-Smith reaction using methylene iodide and zinc-copper catalysts can be used to form cyclopropanes. A third method is to expose the fatty acids and triglycerides to oxygenase enzymes to produce hydroxy fatty acids, e.g., soy oils. This would provide a fatty acid composition resembling ricinoleic (i.e. castor) fatty acids. To reduce crystallization temperatures, the method of Lee, Johnson and Hammond (1995) could be used to form branched chain fatty acid esters.

In addition to the base oil, the vegetable-based biodegradable liquid lubricant composition includes vegetable oils containing hydroxy fatty acids as mono-, di- or triglycerides (containing an OH group where hydrogen is normally placed in edible oils). The hydroxyl groups are very reactive and help to prevent the breakdown of the oils under extreme (heat and friction) conditions by forming dimers as well as reacting with metals in contact with the lubricant. Preferably, the hydroxy fatty acids make up 5% to 15% of the oil composition.

The hydroxy oils can be obtained from castor, lesquerella or other hydroxy fatty acid sources although canola, rapeseed and the other base oils do not naturally have the hydroxy fatty acids necessary to function as a hydroxy oil, they can be processed using various oxygenase such as lipoxygenase so that it is possible to use one of them as the hydroxy oil as well. The oils need to be dimerized and esterified in order to produce the necessary hydroxy fatty acids. There are a variety of known protocols which are used to accomplish the dimerization and esterification. For example, urea can be used to fractionate triglycerides into fatty acids. Once free fatty acids are formed, additional modifications as described above can be made.

Another method is to use polyenes with 3 or more double bonds to react with alkali salts to produce trans addition products which be converted to cyclized compounds (monocyclic cyclohexadiene or bicyclic indene) systems via the Simmons-Smith reaction and the Diels-Adler reaction. Dimerization is occurring between alkene chains and is increased in the presence of hydroxy fatty acids and heat. Therefore, it is likely that dimerization is an ongoing reaction once the oil is put to use in an internal combustion engine.

A second method employs branch-chain fatty acids derived from diene or other polyene sources. The use of dimers or branch chain fatty acids to reduce pour point is a viable alternative to wax esters.

A third method is the interesterification of triacylglycerides to produce uniform and very monounsaturated oils for lubricant stability. Saturated triglycerides can be collected and removed at relatively low temperature, about 5° C., causing additional saturated triacylglyceride form. Eventually, almost pure monene and diene triglycerides can be collected.

Liquid wax esters used are composed of aliphatic alcohols and fatty acid chains of 24 to 48 carbons in length. Jojoba is the primary source of these liquid wax esters. These wax esters tend to bond to metal, coating the wear surfaces and reducing wear. Sulfonated jojoba can be utilized (wherein a normal $RCH_2$ $(CH_2)$ COOH is altered to form a long chain sulfate such as RCH $(SO_3H)$ COOH with the application of sulfur trioxide, or sulfuric acid as a viscosity enhancer and additional lubrication source for the oil. Currently, esters from transgenic *Brassic napus* (rapeseed and canola) have shown efficacy equal to that of the jojoba.

The completed blended oil has been noted to have unusual fatty acid compositions atypical of vegetable oils. Methyl esters of free fatty acids from vegetable oils typically occur in even numbered carbon chains. Although it is not completely understood, it is believed that reactions between the different components of the blended oil work to enhance the ability of the sum of the vegetable based composition to act as an effective lubricant. The second property is oxidative stability. Vegetable oils, particularly triglycerides, are highly reactive and can undergo cross-linking at unsaturated sites of the fatty acids. The result would be the formation of highly polymerized molecules and eventually the formation of a "plastic" molecule. The presence of the natural and/or synthesized antioxidant inhibits polymerization extends the life of the oil.

The above description is given for the purposes of illustration and explanation. It will be apparent to those skilled in the art that modifications can be made to the invention as described above without departing from its scope or its spirit.

Now having described our invention, what we claim is:

1. A lubricated internal combustion engine having as the lubricant a composition comprising vegetable-based products, wherein the lubricant is made by combining at least:

a substantially hydroxy fatty acid free, vegetable mono, di and triglyceride base oil making up 68 to 90% of the composition by volume, wherein at least 65% of the fatty acid has a chain length of 16 to 24 carbon atoms, a vegetable oil additive having hydroxy fatty acids and comprising 5 to 30% of the composition by volume, and a liquid vegetable wax comprising 3 to 8% of the composition by volume.

2. The lubricated internal combustion engine of claim 1 wherein the machine is an automobile engine.

3. The lubricated internal combustion engine of claim 1 wherein the machine is a four-cycle internal combustion engine.

4. The lubricated internal combustion engine of claim 1 wherein the engine is a two-cycle engine.

5. The lubricated internal combustion engine of claim 1 wherein the engine is a wankel engine.

6. The lubricated internal combustion engine of claim 1 wherein the engine is a turbine engine.

7. An internal combustion engine having at least one wear surface coated with a lubricant composition comprising substantially vegetable-based products, wherein the composition is made by combining at least:

a substantially hydroxy fatty acid-free, vegetable fatty acid mono, di and triglyceride base oil making up a majority of the composition wherein at least 65% of the fatty acid contained therein has a chain length of 16 to 24 carbon atoms, wherein the base oil is derived from a vegetable in the Cruciferae family;

5–30% by volume of a vegetable oil additive having hydroxy fatty acids; and a liquid vegetable wax.

8. The internal combustion engine claim 7 wherein the machine is an automobile engine.

9. The internal combustion of claim 7 wherein the machine is a four-cycle internal combustion engine.

10. The internal combustion engine of claim 7 wherein the machine is a turbine engine.

11. A lubricated external combustion engine having as the lubricant a composition comprising vegetable-based products, wherein the lubricant is made by combining at least:

a substantially hydroxy fatty acid free, vegetable mono, di and triglyceride base oil making up 68 to 90% of the composition by volume, wherein at least 65% of the fatty acid has a chain length of 16 to 24 carbon atoms, a vegetable oil additive having hydroxy fatty acids and comprising 5 to 30% of the composition by volume, and a liquid vegetable wax comprising 3 to 8% of the composition by volume.

12. The lubricated external combustion engine of claim 11 wherein the machine is an automobile engine.

13. An external combustion engine having at least one wear surface coated with a lubricant composition comprising substantially vegetable-based products, wherein the composition is made by combining at least:

a substantially hydroxy fatty acid-free, vegetable fatty acid mono, di and triglyceride base oil making up a majority of the composition wherein at least 65% of the fatty acid contained therein has a chain length of 16 to 24 carbon atoms, wherein the base oil is derived from a vegetable in the Cruciferae family;

5–30% by volume of a vegetable oil additive having hydroxy fatty acids; and a liquid vegetable wax.

14. The external combustion engine claim 13 wherein the machine is an automobile engine.

* * * * *